M. T. CONNOLLY.
LOCKING DEVICE FOR VALVES.
APPLICATION FILED FEB. 25, 1913.
1,099,280.
Patented June 9, 1914.
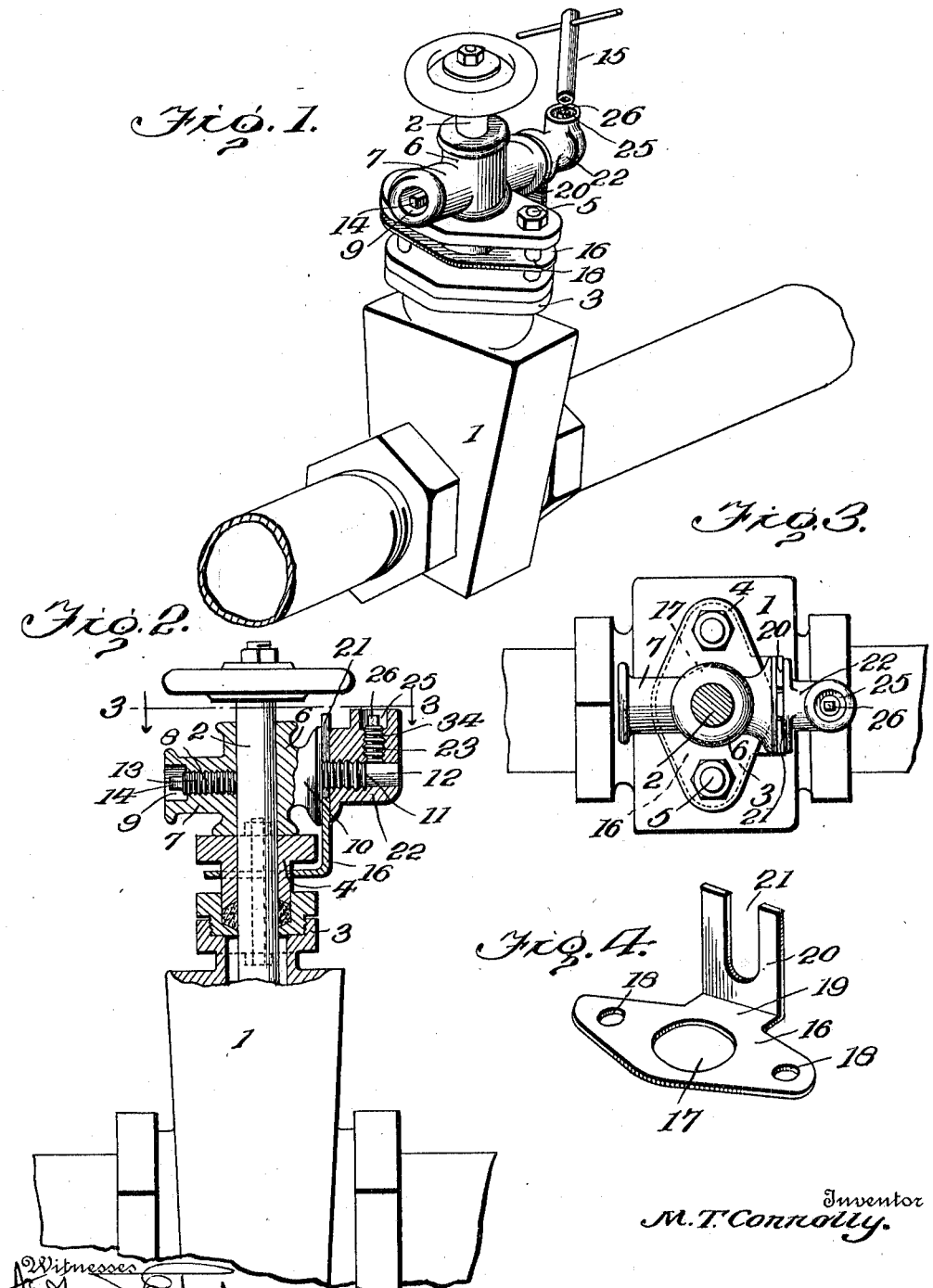
Inventor
M. T. Connolly.

UNITED STATES PATENT OFFICE.

MICHAEL T. CONNOLLY, OF HIGHLAND PARK, MICHIGAN.

LOCKING DEVICE FOR VALVES.

1,099,280.  Specification of Letters Patent.  Patented June 9, 1914.

Application filed February 25, 1913. Serial No. 750,681.

*To all whom it may concern:*

Be it known that I, MICHAEL T. CONNOLLY, citizen of the United States, residing at Highland Park, in the county of Wayne and State of Michigan, have invented certain new and useful Improvements in Locking Devices for Valves, of which the following is a specification.

This invention has as its object to provide a device for locking valves in such manner as to prevent them being opened or closed by unauthorized persons.

Under some conditions, as for example where repairs are being made in heating systems or where damage may be caused by an inexperienced or unauthorized person opening or closing a valve it is desirable that some means be provided for locking the valve to prevent its manipulation and the present invention therefore aims to provide such means adapted to be readily and quickly applied to any ordinary valve and securely hold the stem of the valve against rotation in either direction.

For a full understanding of the invention reference is to be had to the following description and accompanying drawing, in which:—

Figure 1 is a perspective view of the device embodying the present invention, applied to a valve. Fig. 2 is a vertical sectional view through the device applied to a valve. Fig. 3 is a horizontal sectional view on the line 3—3 of Fig. 2. Fig. 4 is a perspective view of one member of the locking device.

Corresponding and like parts are referred to in the following description and indicated in all the views of the accompanying drawing by the same reference characters.

In the drawing the numeral 1 indicates a valve of the ordinary type and 2 the stem of the valve. The stem 2 is fitted through a stuffing box of the ordinary type indicated in general by the numeral 3 and the cap of the box is indicated at 4 and is held in place by means of bolts 5.

The locking device embodying the present invention includes a sleeve 6, the bore of which is of a diameter to receive the valve stem 2. The sleeve 6 is provided with a laterally projecting portion 7 having a threaded bore 8 which communicates with the bore of the sleeve 6 and is enlarged at the end of the extension 7 as indicated at 9. At a point preferably diametrically opposite the extension 7, the sleeve 6 is formed with a head 10 having a threaded stud 11 projecting axially therefrom. The stud 11 at its outer end is unthreaded as indicated at 12. The sleeve 6 is, as illustrated in Fig. 2, preferably arranged upon the valve stem 2 in such manner that its lower end will rest upon the cap 4 of the stuffing box of the valve casing and the sleeve is held against rotation upon the said stem 2 by means of a set-screw 13 which is threaded into the bore 8 and has a squared end 14 for the application of a wrench, such as shown in Fig. 1 and indicated by the numeral 15. The head 14 of the set-screw 13 is received within the enlarged end 9 of the bore 8 and consequently cannot be engaged by one's fingers or any ordinary wrench and as a result any one who wishes to loosen the screw must obtain a certain style of wrench.

As stated above, the sleeve 6 is held against rotation upon the valve stem 2 by means of the set-screw 13 and in order to prevent the stem from being rotated in either direction, it is necessary that some means be provided for holding the sleeve 6 against rotation with respect to the valve casing, and such means will now be described. The means mentioned above includes a locking member in the form of a plate 16 which is formed with an opening 17 and with openings 18. At one side the plate is provided with a lateral extension 19 having an upstanding portion 20 provided with a notch 21. In applying the locking member to the valve, the cap 4 of the stuffing box has its neck fitted through the opening 17 and the bolts 5 are fitted through the openings 18. When so assembled with the stuffing box, the upstanding portion 20 of the said member will project beside the flat face of the head 10 and the stud 11 will be received in the notch 21. In order to hold the locking member securely in place against the head 10, a nut 22 is threaded upon the stud 11 and is held in place by means of a set screw 23 which is threaded into a bore 24 which opens at one side of the nut. The set-screw 23, when tightened, bears against the unthreaded end 12 of the stud 11 and the bore 24 is increased in diameter as at 25 at its outer end to house the squared end 26 of the set-screw 23.

It will now be apparent that after the sleeve 6 has been tightened upon the valve stem 2 and the set-screw 13 has been tightened, the nut 22 is threaded upon the stud 11 so as to bear firmly against the notched portion of the extension 20 and the set-screw 23 is tightened to lock the nut 22 in place. When the parts are thus adjusted the stem 2 will be held against rotation in either direction and the valve will remain in the position to which it was adjusted.

Having thus described the invention what is claimed as new is:—

1. In a device of the class described, a sleeve arranged to fit the stem of a valve, a set-screw carried by the sleeve for holding the same against rotation upon the valve-stem, the sleeve having a laterally projecting threaded stud, a member arranged for connection with the casing of the valve and having a portion provided with an opening receiving the said stud, and a nut threaded upon the stud and bearing against the said portion of the last mentioned member.

2. In a device of the class described, a sleeve arranged to fit the stem of a valve, a set-screw carried by the sleeve for holding the same against rotation upon the valve-stem, the sleeve having a laterally projecting threaded stud, a member arranged for connection with the casing of the valve and having a portion provided with an opening receiving the said stud, a nut threaded upon the stud and bearing against the said portion of the last mentioned member, and a set-screw carried by the nut and adjusted to bear against the stud.

3. In a device of the class described, the combination with a valve including a casing and a stem, of a member permanently fixed with respect to the casing and having upstanding spaced fingers, a sleeve fitted upon the valve stem, means for securing the sleeve against rotation with respect to the stem, the sleeve being provided with a threaded stud projecting between the fingers, a head threaded upon the stud and binding the fingers against that portion of the sleeve from whic hthe stud projects, and means securing the head upon the stud against backward rotation.

In testimony whereof I affix my signature in presence of two witnesses.

MICHAEL T. CONNOLLY. [L. S.]

Witnesses:
A. MILTON HUMBER,
LAURA E. LIDDELL.

---

Copies of this patent may be obtained for five cents each, by addressing the "Commissioner of Patents, Washington, D. C."